(12) United States Patent
Kontani

(10) Patent No.: US 11,075,539 B2
(45) Date of Patent: Jul. 27, 2021

(54) ALTERNATOR CONTROL DEVICE

(71) Applicants: AutoNetworks Technologies, Ltd., Mie (JP); Sumitomo Wiring Systems, Ltd., Mie (JP); Sumitomo Electric Industries, Ltd., Osaka (JP)

(72) Inventor: Tsuyoshi Kontani, Mie (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

( * ) Notice: Subject to any disclaimer, the term of this patent is extended or adjusted under 35 U.S.C. 154(b) by 165 days.

(21) Appl. No.: 16/480,065

(22) PCT Filed: Jan. 16, 2018

(86) PCT No.: PCT/JP2018/000980
§ 371 (c)(1),
(2) Date: Jul. 23, 2019

(87) PCT Pub. No.: WO2018/142915
PCT Pub. Date: Aug. 9, 2018

(65) Prior Publication Data
US 2019/0379236 A1    Dec. 12, 2019

(30) Foreign Application Priority Data
Feb. 3, 2017   (JP) .............................. JP2017-018545

(51) Int. Cl.
*H02J 7/00*    (2006.01)
*H02J 7/14*    (2006.01)
*B60L 58/12*   (2019.01)

(52) U.S. Cl.
CPC ............ *H02J 7/1446* (2013.01); *B60L 58/12* (2019.02); *B60L 2240/12* (2013.01); *B60L 2240/62* (2013.01)

(58) Field of Classification Search
None
See application file for complete search history.

(56) References Cited

U.S. PATENT DOCUMENTS 4,665,319 A * 5/1987 Seepe ................... F02D 41/083
290/3
5,030,898 A * 7/1991 Hokanson ............... B60L 50/12
318/146

(Continued)

FOREIGN PATENT DOCUMENTS

JP    2014-054965 A    3/2014

OTHER PUBLICATIONS

International Search Report, Application No. PCT/JP2018/000980, dated Mar. 27, 2018. ISA/Japan Patent Office.

*Primary Examiner* — Arun C Williams
(74) *Attorney, Agent, or Firm* — Honigman LLP

(57) ABSTRACT

An alternator control device includes a battery state determination unit determining whether the state of a battery is a predetermined normal state, a vehicle speed determination unit determining whether the speed of a vehicle is within a predetermined low speed range, a position determination unit determining whether the position of the vehicle meets a predetermined positional condition, and an output voltage instruction unit gives an instruction relating to the output voltage of the alternator. The output voltage instruction unit gives an instruction to increase the output voltage of the alternator to a voltage that is greater than a reference voltage, if it is determined that the state of the battery is not the predetermined normal state, if it is determined that the speed of the vehicle is within the predetermined low speed (Continued)

range, and if it is determined that the position of the vehicle meets the positional condition.

7 Claims, 4 Drawing Sheets

(56) References Cited

U.S. PATENT DOCUMENTS

| | | | |
|---|---|---|---|
| 5,924,406 A | 7/1999 | Kinugasa et al. | |
| 2002/0000791 A1* | 1/2002 | Taniguchi | H02P 9/04 322/28 |
| 2002/0089866 A1* | 7/2002 | Keim | H02J 7/1423 363/89 |
| 2002/0097026 A1* | 7/2002 | Kernahan | H02J 7/1438 322/28 |
| 2003/0107351 A1* | 6/2003 | Taniguchi | F02D 29/06 322/36 |
| 2005/0046396 A1* | 3/2005 | Patterson | H02P 5/00 322/28 |
| 2005/0282065 A1* | 12/2005 | Kubo | H02J 7/007192 429/62 |
| 2007/0007818 A1* | 1/2007 | O'Gorman | H02J 7/2434 307/1 |
| 2007/0170778 A1* | 7/2007 | Yamaguchi | F02N 11/0862 307/10.1 |
| 2010/0286857 A1 | 11/2010 | Otake | |
| 2017/0346431 A1* | 11/2017 | Auer | H02P 9/10 |

* cited by examiner

ALTERNATOR CONTROL DEVICE

CROSS-REFERENCE TO RELATED APPLICATIONS

This application is the U.S. national stage of PCT/JP2018/000980 filed on Jan. 16, 2018, which claims priority of Japanese Patent Application No. JP 2017-018545 filed on Feb. 3, 2017, the contents of which are incorporated herein.

TECHNICAL FIELD

The present disclosure relates to an alternator control device configured to control an alternator installed in a vehicle.

BACKGROUND ART

Recently, as a result of, for example, an increase in the number of electric loads installed in a vehicle, the amount of electric power that is consumed in the entire vehicle has been on the rise. Accordingly, attempts have been made to reduce electric power consumption in the entire vehicle, and an example thereof is a charge control device disclosed in Patent Document 1 that disables operations of an alternator in a situation in which power generation is not needed, thereby improving fuel economy.

In on-board systems in which an alternator is installed, fuel economy can be improved by reducing an instruction voltage for the alternator to suppress operations of the alternator, but if a high current load (such as, for example, an electric power steering or a steer-by-wire system) is operating when the instruction voltage for the alternator is low, the consumption current rapidly increases, which involves the risk that the voltage in the entire vehicle may significantly drop.

The present disclosure was made in view of the above-described circumstances, and it is an object thereof to provide an alternator control device that can effectively prevent occurrence of a problem resulting from a rapid increase in current consumption in a situation in which an output voltage of an alternator is suppressed.

SUMMARY

According to a first aspect of the present disclosure, an alternator control device is provided in an on-board power supply system that includes an on-board battery, and an on-board alternator that performs a power generation operation to supply electric power to the battery, the alternator control device being configured to control the alternator and including a battery state determination unit configured to determine whether or not a state of the battery is a predetermined normal state. A vehicle speed determination unit is configured to determine whether or not a speed of a vehicle in which the on-board power supply system is installed is within a predetermined low speed range. A position determination unit is configured to determine whether or not a position of the vehicle meets a predetermined positional condition. An output voltage instruction unit is configured to give an instruction to increase an output voltage of the alternator to a voltage that is greater than a reference voltage, if it is determined by the battery state determination unit that the state of the battery is not the predetermined normal state, if it is determined by the vehicle speed determination unit that the speed of the vehicle is within the predetermined low speed range, and if it is determined by the position determination unit that the position of the vehicle meets the positional condition, wherein the vehicle speed determination unit determines whether or not the speed of the vehicle is within the low speed range based on an output from a sensor installed in the vehicle, and the position determination unit determines that the positional condition is met in at least one of cases where the position of the vehicle is in a predetermined parking vicinity area and where the position of the vehicle is in a predetermined intersection vicinity area.

According to a second aspect of the present disclosure, an alternator control device is provided in an on-board power supply system that includes an on-board battery, and an on-board alternator that performs a power generation operation to supply electric power to the battery, the alternator control device being configured to control the alternator and including a battery state determination unit configured to determine whether or not a state of the battery is a predetermined normal state. A vehicle speed determination unit is configured to determine whether or not a speed of a vehicle in which the on-board power supply system is installed is within a predetermined high speed range. A position determination unit is configured to determine whether or not a position of the vehicle meets a predetermined positional condition. An output voltage instruction unit is configured to give an instruction to increase an output voltage of the alternator to a voltage that is greater than a reference voltage, if it is determined by the battery state determination unit that the state of the battery is not the predetermined normal state, if it is determined by the vehicle speed determination unit that the speed of the vehicle is within the predetermined high speed range, and if it is determined by the position determination unit that the position of the vehicle meets the positional condition, wherein the vehicle speed determination unit determines whether or not the speed of the vehicle is within the high speed range based on an output from a sensor installed in the vehicle, and the position determination unit determines that the positional condition is met in at least one of cases where the position of the vehicle is in a predetermined curve vicinity area on a predetermined arterial road and where the position of the vehicle is in a predetermined change-to-low-speed prospective area on a predetermined arterial road.

Advantageous Effects of Disclosure

The alternator control device according to the first aspect of the present disclosure can easily handle a rapid increase in the electric power consumption due to a load that tends to be used under a predetermined positional condition when the vehicle travels at a low speed, and even if, under an abnormal state of the battery, the load operates in the above-described situation (in which the speed of the vehicle is in the predetermined low speed range and the position of the vehicle meets the predetermined positional condition), a problem resulting from an insufficient output voltage of the alternator is unlikely to occur.

The alternator control device according to the second aspect of the present disclosure can easily handle a rapid increase in the electric power consumption due to a load that tends to be used under a predetermined positional condition when the vehicle travels at a high speed, and even if, under an abnormal state of the battery, the load operates in the above-described situation (in which the speed of the vehicle is in the predetermined high speed range and the position of the vehicle meets the predetermined positional condition), a problem resulting from an insufficient output voltage of the alternator is unlikely to occur.

DETAILED DESCRIPTION OF PREFERRED EMBODIMENTS

Figure 1:
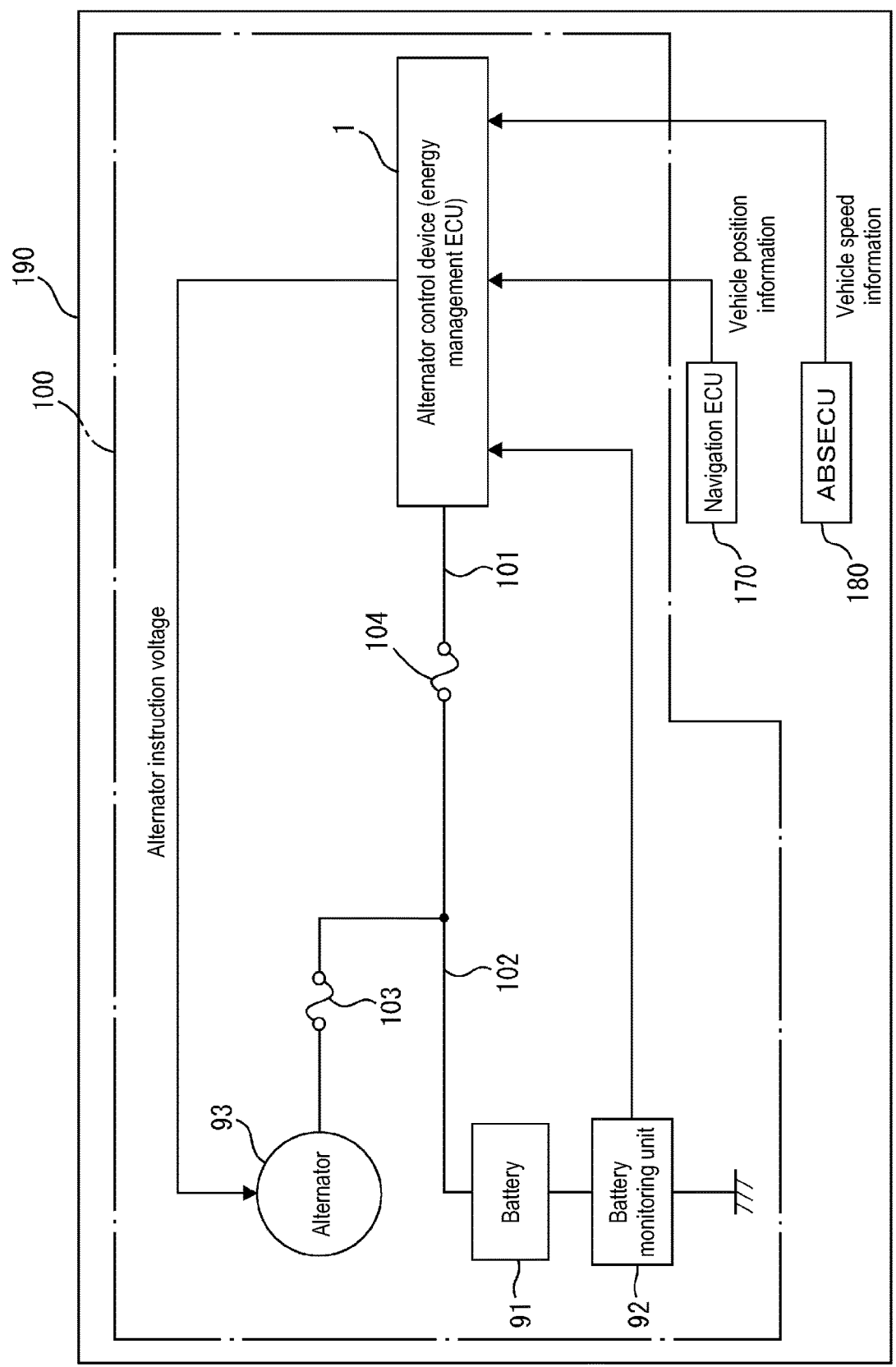
FIG. 1 is a block diagram schematically illustrating an electrical configuration of a vehicle provided with an on-board power supply system that includes an alternator control device according to Embodiment 1.

Hereinafter, preferred examples of the disclosure will be described.

In the alternator control device according to the first aspect, the position determination unit may function to determine that the positional condition is met at least in a case where the position of the vehicle is in a predetermined parking vicinity area.

If the vehicle is travelling at a low speed and is located in the parking vicinity area, it is likely that the vehicle will enter a parked state, and loads associated with parking (such as, for example, an electric power steering system, a steer-by-wire system, and an electric control type four-wheel steering system) will operate, which involves the risk that the consumption current will rapidly increase. Accordingly, the position determination unit functions to determine that a positional condition is met at least in a case where the position of the vehicle is in the predetermined parking vicinity area. With this measure, if the speed of the vehicle changes to a low speed in a parking vicinity area, it is possible to increase the output voltage of the alternator to prepare for expected load currents, and thus it is easier to prevent the problem of an insufficient output voltage that results from an operation associated with parking when the battery is in an abnormal state.

In the alternator control device according to the first aspect, the position determination unit may function to determine that the positional condition is met at least in a case where the position of the vehicle is in a predetermined intersection vicinity area.

If the vehicle travels at a low speed and is located in the intersection vicinity area, it is likely that the vehicle will turn right or left for example, and loads associated with a right or left turn (such as, for example, an electric power steering system, a steer-by-wire system, and an electric control type four-wheel steering system) will operate, which involves the risk that the consumption current will rapidly increase. Accordingly, the position determination unit functions to determine that the positional condition is met at least in a case where the position of the vehicle is in the predetermined intersection vicinity area. With this measure, if the speed of the vehicle changes to a low speed in an intersection vicinity area, it is possible to increase the output voltage of the alternator to prepare for expected load currents, and thus it is easier to prevent the problem of an insufficient output voltage that results from an operation associated with a right or left turn when the battery is in an abnormal state.

In the alternator control device according to the second aspect, the position determination unit may function to determine that the positional condition is met at least in a case where the position of the vehicle is in a predetermined curve vicinity area on a predetermined arterial road.

If the vehicle is located in the curve vicinity area while traveling on an arterial road at a high speed, it is likely that the vehicle will enter a curve at a relatively high speed, and in this case, loads associated with a curve-turning operation (such as, for example, an electric-powered stabilizer, an electric-powered suspension, an electric-powered damper, and an electric-powered four-wheel steering system) will operate, which involves the risk that the consumption current will rapidly increase. Accordingly, the position determination unit functions to determine that the positional condition is met at least in a case where the position of the vehicle is in the given curve vicinity area on a predetermined arterial road. With this measure, if the vehicle enters a curve vicinity area in a predetermined state while traveling on an arterial road, it is possible to increase the output voltage of the alternator to prepare for expected load currents, and thus it is easier to prevent the problem of an insufficient output voltage that results from a curve-turning operation being executed when the battery is in an abnormal state.

In the alternator control device according to the second aspect, the position determination unit may function to determine that the positional condition is met at least in a case where the position of the vehicle is in a predetermined change-to-low-speed prospective area on a predetermined arterial road.

If the vehicle is located in the change-to-low-speed prospective area (such as an area near a tollgate or in the vicinity of a predetermined area in which traffic jams are frequently recorded) while traveling on an arterial road at a high speed, it is likely that the speed of the vehicle will change to a low speed, and a load associated with the change to the low speed (such as, for example, an electric-powered control brake) will operate, which involves the risk that the consumption current will rapidly increase. Accordingly, the position determination unit functions to determine that the positional condition is met at least in a case where the position of the vehicle is in the given change-to-low-speed prospective area on a predetermined arterial road. With this measure, if the vehicle enters a change-to-low-speed prospective area in a predetermined state while traveling on an arterial road, it is possible to increase the output voltage of the alternator to prepare for an expected load current, and thus it is easier to prevent the problem of an insufficient output voltage that results from an operation to change the speed from a high speed state to a low speed state when the battery is in an abnormal state.

In the alternator control device according to the first and second aspects, the battery state determination unit may function to determine that the state of the battery is the predetermined normal state at least on the condition that a state of deterioration of the battery does not exceed a predetermined level of deterioration.

If the state of deterioration of the battery exceeds a predetermined level of deterioration (if the state of deterioration of the battery has advanced), this alternator control device can easily increase the output voltage of the alternator before rapid electric power consumption occurs, and make it less likely that a problem resulting from an insufficient output voltage of the alternator will occur.

In the alternator control device according to the first and second aspects, the battery state determination unit may function to determine that the state of the battery is the predetermined normal state at least on the condition that a state of charge of the battery exceeds a predetermined level of charge.

If the state of charge of the battery does not exceed a predetermined level of charge (if the amount of charge of the battery 91 is relatively low), this alternator control device can easily increase the output voltage of the alternator before rapid electric power consumption occurs, and make it less likely that a problem resulting from an insufficient output voltage of the alternator will occur.

Embodiment 1

Hereinafter, Embodiment 1 of the present disclosure will be described.

A vehicle 190 shown in FIG. 1 is provided with, in the interior thereof, an on-board power supply system 100 (hereinafter, also referred to as "power supply system 100"), which is configured as a system capable of supplying electric power to various objects in the vehicle 190, and various devices that are supplied with electric power from the power supply system 100. In the example of FIG. 1, in addition to the power supply system 100, an ECU (Electronic Control Unit) 170 that configures a car navigation system (hereinafter, also referred to as "navigation ECU 170" or "ECU 170"), and an Antilock Brake System Electronic Control Unit (ABSECU) 180 that controls an antilock brake system, are provided.

The power supply system 100 is provided with an on-board battery 91, a battery monitoring unit 92 that monitors the battery 91, an on-board alternator 93 that can supply generated electric power to the battery 91, loads, and the like, and an alternator control device 1 that controls the alternator 93. Note that the power supply system 100 is also provided with an auxiliary battery different from the battery 91, a charge circuit, and the like, although they are not shown.

The battery 91 is configured as, for example, a well-known on-board battery such as a lead battery, and functions as a main battery (main power supply). The battery 91 is electrically connected, at a high potential-side terminal thereof, to a wiring part 102, and applies a predetermined output voltage (hereinafter, also referred to as "+B voltage") to the wiring part 102. The wiring part 102 to which the battery 91 is connected is electrically connected to a power path 101 via a fuse 104. Note that the power path 101 is also connected to various loads (illustration of which is omitted) other than the alternator control device 1, and functions as a path for supplying electric power to the loads.

The alternator 93 is configured as a well-known on-board power generator, and functions to operate interlocked with a not-shown drive shaft of an engine to generate electric power. The alternator 93 is electrically connected to the wiring part 102 and the battery 91 via a fuse 103. The alternator 93 is switched between a power generating state and a disabled state by the alternator control device 1, and an output voltage of the alternator 93 at the time of power generation is also controlled by the alternator control device 1.

The battery monitoring unit 92 is constituted by, for example, a sensor or an ECU for monitoring the state of the battery 91. The battery monitoring unit 92 is configured to be able to measure an output voltage and an output current of the battery 91 using a well-known method, detect a State Of Charge (SOC), which is an index value of residual battery charge, using a well-known method, and transmit the detected SOC to the alternator control device 1. The battery monitoring unit 92 also detects the degree of deterioration (State Of Health (SOH)) of the battery 91 using a well-known method, and transmits the detected SOH to the alternator control device 1. Note that the SOH and SOC of the battery 91 can be detected using well-known methods disclosed in, for example, JP 2009-214766A, JP 2009-214604A, JP 2007-93358A, and the like. Alternatively, well-known methods other than those mentioned above may also be used for the detection.

The navigation ECU 170 functions to specify the position of the vehicle 190 based on information obtained from a not-shown Global Positioning System (GPS) communication unit. The GPS communication unit is configured as a well-known GPS communication device capable of communicating with a GPS satellite (illustration of which is omitted), and the navigation ECU 170 can calculate position information (for example, information such as latitude and longitude) with which the position of the vehicle 190 is specified based on information obtained by the GPS communication unit communicating with a plurality of GPS satellites. Note that various well-known methods may be employed as the method in which the GPS communication device communicates with the GPS satellites to specify the position of the vehicle.

The navigation ECU 170 is provided with a storage unit that stores map information including position information regarding roads and the like. The map information storage unit is constituted by, for example, one or more types of memory devices, and stores map data with which the positions of roads and buildings can be specified in association with latitude and longitude, thereby configuring a map database. The map database configured by the map information storage unit is map data that is used in the car navigation system, and stores, for example, map data on all roads in Japan, and associated facility data regarding various types of facilities, stores, and the like.

The ABSECU 180 is an information processing device that controls the antilock brake system (ABS). The ABSECU 180 is provided with a control circuit such as a microcomputer. The ABSECU 180 is configured to be able to obtain wheel speed information from a not-shown wheel speed sensor, and to calculate the speed (vehicle speed) of the vehicle 190 based on the information obtained from the wheel speed sensor. The vehicle speed calculated by the ABSECU 180 is given to the alternator control device 1 as vehicle speed information.

In the vehicle 190 shown in FIG. 1, various loads other than the shown loads are provided. The various loads correspond to, for example, many electric loads used in the vehicle, such as lighting system electric loads such as a head lamp, accessory system electric loads such as an audio device, a navigation device, and windshield wipers, and driving system electric loads such as an electric-powered control brake, an electric power steering system, a steer-by-wire system, an electric control type four-wheel steering system, an electric-powered stabilizer, an electric-powered suspension, and an electric-powered damper.

Figure 2:
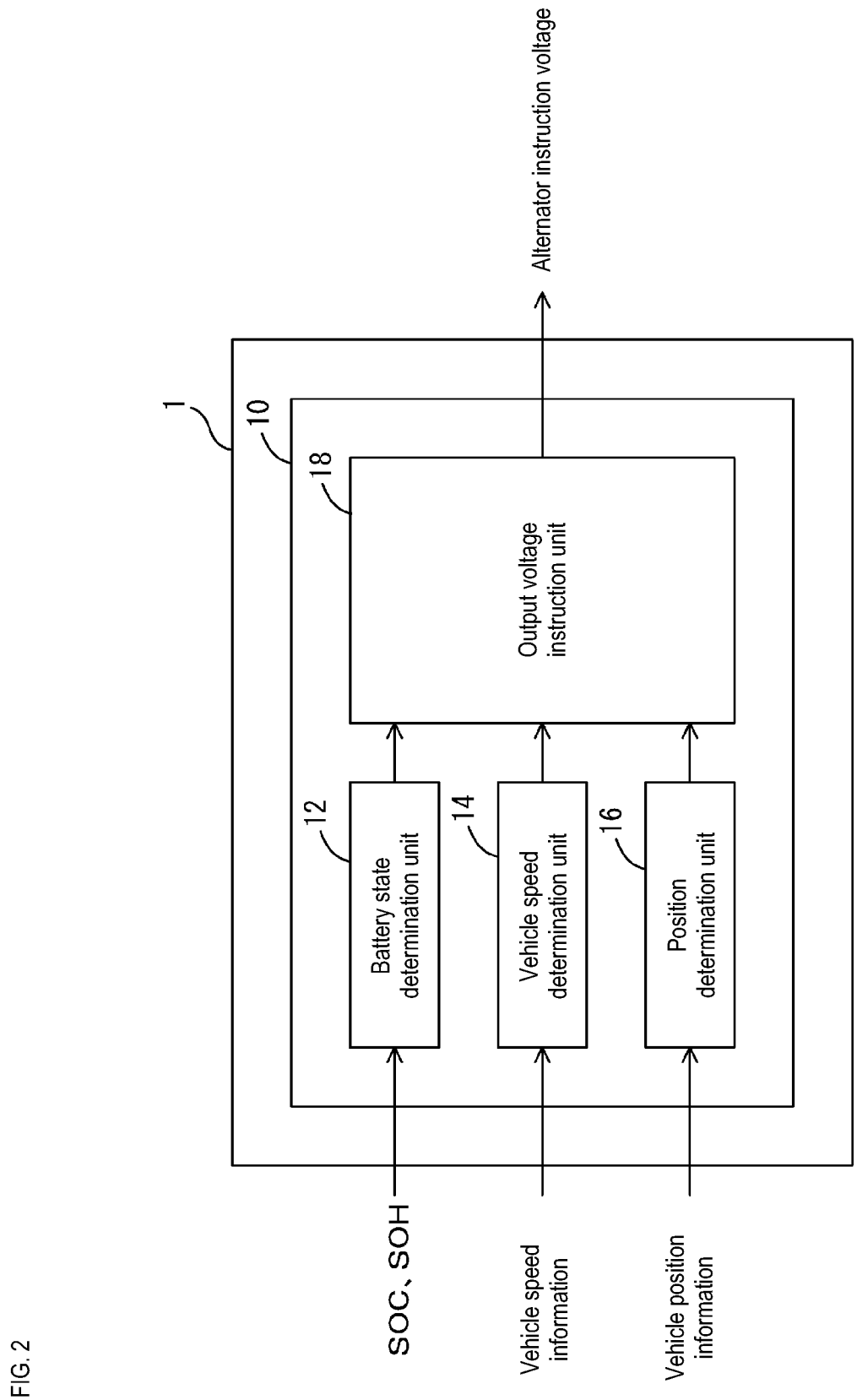
FIG. 2 is a functional block diagram schematically illustrating an internal configuration of the alternator control device of Embodiment 1.

The alternator control device 1 is an electronic control unit for controlling power generation by the alternator 93, and functions as an energy management ECU for managing energy. The alternator control device 1 is configured as an information processing device that includes a control circuit 10 as shown in FIG. 2, other not-shown electronic components, and the like. The control circuit 10 is configured by a microcomputer for example, and can execute various functions. Note that FIG. 2 is a functional block diagram illustrating the relationship between functions realized in the alternator control device 1. The functions executed by the blocks in FIG. 2 may also be realized by software processing using an information processing device, or may also be realized by a hardware circuit. Furthermore, the plurality of functions may also be realized by separate devices or a common device. The following description will be given taking an example in which the functions are realized by software processing executed by the control circuit 10 configured as a microcomputer as a typical example.

As shown in FIG. 2, the alternator control device 1 includes the control circuit 10, a not-shown storage unit, and the like. The control circuit 10 is configured as a microcomputer for example, and includes a CPU, a memory such as a ROM or RAM, an AD converter, and the like.

A battery state determination unit 12 is a unit for determining whether or not the state of the battery 91 is a "predetermined normal state". The battery state determination unit 12 determines that the state of the battery 91 is the "predetermined normal state" at least on the condition that the state of deterioration of the battery 91 does not exceed a predetermined level of deterioration. Furthermore, the battery state determination unit 12 determines that the state of the battery 91 is the "predetermined normal state" at least on the condition that the state of charge of the battery 91 exceeds a predetermined level of charge. Specifically, the battery state determination unit 12 determines that the state of the battery 91 is the "predetermined normal state" if the SOC received from the battery monitoring unit 92 exceeds a predetermined first threshold and the SOH received from the battery monitoring unit 92 is not greater than a predetermined second threshold (is less than or equal to the second threshold).

A vehicle speed determination unit 14 is a unit for determining whether or not the speed of the vehicle in which the on-board power supply system 100 is installed is within a predetermined low speed range. In the present configuration, vehicle speed information indicating the speed of the vehicle 190 is input from the ABSECU 180, and the vehicle speed determination unit 14 is configured to be able to determine whether or not the speed of the vehicle 190 is within the predetermined low speed range (for example, a range from 0 (km/h) to less than 20 (km/h)).

A position determination unit 16 is a unit for determining whether or not the position of the vehicle 190 meets a predetermined positional condition. In the present configuration, a specific area is determined in advance on a map specified by using map information, and the position determination unit 16 determines that "the predetermined positional condition is met" if the position of the vehicle 190 specified based on position information obtained from the navigation ECU 170 is within this specific area. Specifically, on the map specified by the map information, a "parking vicinity area", which is a first specific area that includes a parking lot, and an "intersection vicinity area", which is a second specific area that includes an area in the vicinity of an intersection (for example, an area within a predetermined distance from an intersection), are determined in advance, and the position determination unit 16 functions to determine that the predetermined positional condition is met if the position of the vehicle 190 specified based on position information obtained from the navigation ECU 170 is within the "parking vicinity area" or the "intersection vicinity area".

An output voltage instruction unit 18 is a unit for controlling switching of the output voltage of the alternator 93 between a first voltage, which is a reference voltage, and a second voltage higher than the reference voltage. Specifically, the output voltage instruction unit 18 functions to give an instruction to increase the output voltage of the alternator 93 relative to the reference voltage, if it is determined by the battery state determination unit 12 that the state of the battery 91 is not the "predetermined normal state", if it is determined by the vehicle speed determination unit 14 that the speed of the vehicle 190 is in the "predetermined low speed range", and if it is determined by the position determination unit 16 that the position of the vehicle 190 meets the "positional condition".

Figure 3:
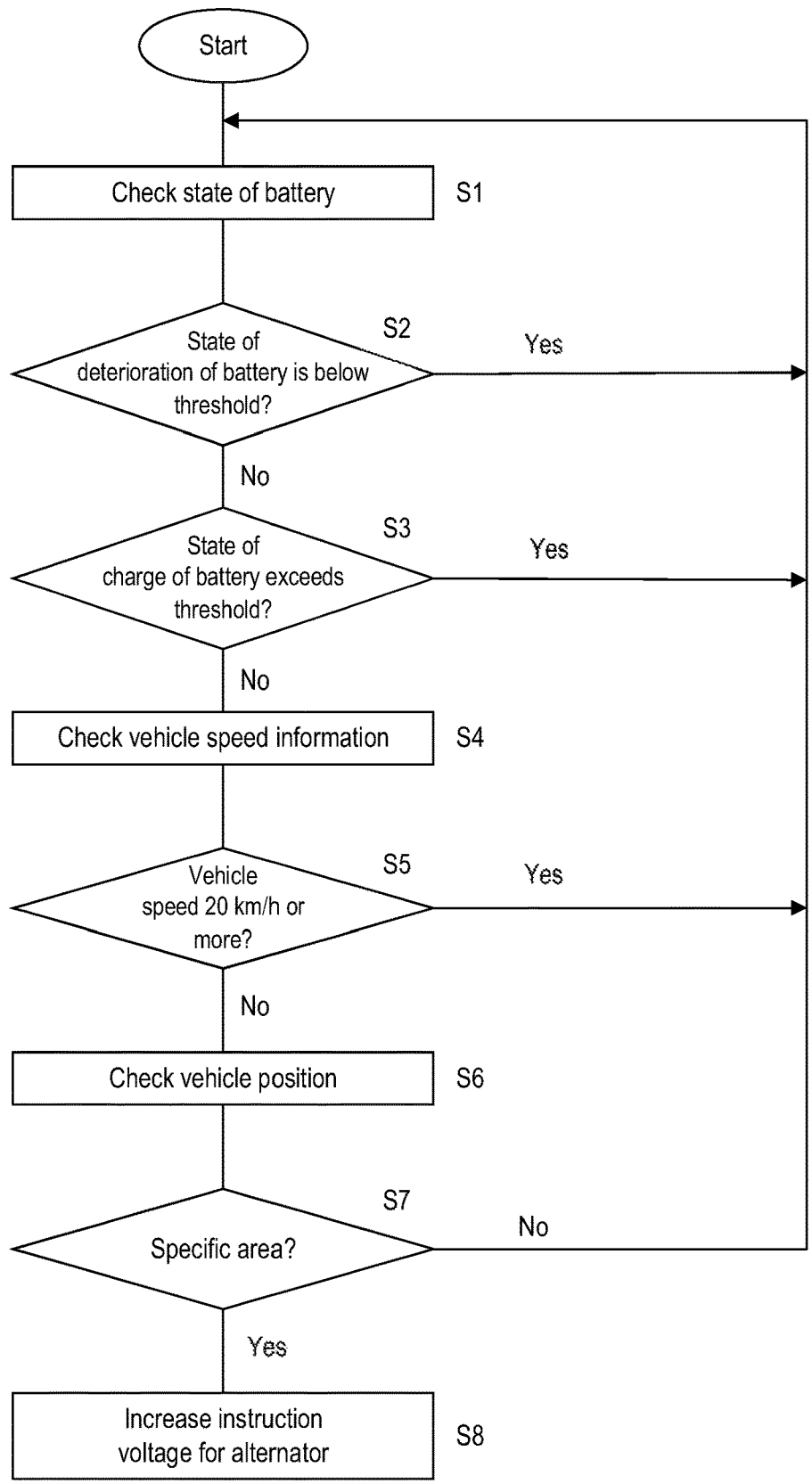
FIG. 3 is a flowchart illustrating an example of a flow of alternator control executed by the alternator control device of Embodiment 1.

The following will describe control of the alternator executed by the alternator control device 1 with reference to FIG. 3 and the like.

The alternator control device 1 executes control shown in FIG. 3 if, for example, the vehicle 190 enters a start-up state (for example, if a start-up switch such as an ignition switch is switched from OFF to ON). After the start of the control of FIG. 3, the alternator control device 1 first checks, in step S1, the state of the battery 91. Specifically, the alternator control device 1 checks for notifications received from the battery monitoring unit 92, and obtains, from the battery monitoring unit 92, values (SOC and SOH) that indicate the state of the battery 91.

After step S1, the alternator control device 1 determines, in step S2, whether or not the state of deterioration of the battery is below a threshold (specifically, whether or not the SOH obtained from the battery monitoring unit 92 is less than or equal to the second threshold). If it is determined in step S2 that the SOH obtained from the battery monitoring unit 92 is less than or equal to the second threshold (if the state of deterioration of the battery is below the threshold), the alternator control device 1 returns to the processing in step S1. On the other hand, if it is determined in step S2 that the SOH obtained from the battery monitoring unit 92 is not less than the second threshold (if the state of deterioration of the battery exceeds the threshold), the alternator control device 1 moves to the processing in step S3.

If No in step S2, the alternator control device 1 determines in step S3 whether or not the state of charge of the battery 91 exceeds a threshold (specifically, whether or not the SOC obtained from the battery monitoring unit 92 exceeds the first threshold). If it is determined in step S3 that the SOC obtained from the battery monitoring unit 92 exceeds the first threshold (the state of charge of the battery 91 exceeds the threshold), the alternator control device 1 returns to the processing in step S1. On the other hand, if it is determined in step S3 that the SOC obtained from the battery monitoring unit 92 does not exceed the first threshold (the state of charge of the battery 91 does not exceed the threshold), the alternator control device 1 moves to the processing in step S4.

If No in step S3, the alternator control device 1 checks, in step S4, vehicle speed information received from the ABSECU, and then determines, in step S5, whether or not the speed (vehicle speed) of the vehicle 190 specified by the vehicle speed information is in the predetermined low speed range (specifically, a range from 0 km/h or more and less than 20 km/h). If it is determined in step S5 that the vehicle speed is greater than or equal to 20 km/h (it is determined that the vehicle speed is not in the predetermined low speed range), the alternator control device 1 returns to the processing in step S1. On the other hand, if it is determined in step S5 that the vehicle speed is not greater than or equal to 20 km/h (it is determined that the vehicle speed is in the predetermined low speed range), the alternator control device 1 moves to the processing in step S6.

If No in step S5, the alternator control device 1 checks, in step S6, vehicle position information received from the navigation ECU 170, and confirms the current position of the vehicle 190 (at a point in time when step S6 is executed). Then, after step S6, the alternator control device 1 performs processing in step S7 to determine whether or not the position of the vehicle 190 confirmed in step S6 is in the above-described specific area (specifically, the predetermined "parking vicinity area" or "intersection vicinity area"). If it is determined in step S7 that the position of the vehicle 190 confirmed in step S6 is in neither the predetermined "parking vicinity area" nor "intersection vicinity area", the alternator control device 1 returns to the processing in step S1. On the other hand, if it is determined in step S7 that the position of the vehicle 190 confirmed in step S6 is in the predetermined "parking vicinity area" or the "intersection vicinity area", the alternator control device 1 sets the instruction voltage for the alternator 93 to a second voltage that is higher than the reference voltage (first voltage).

If, in step S8, the instruction voltage for the alternator 93 is set to the second voltage in this way, the setting just needs to be kept until a predetermined termination timing (for example, a timing at which a predetermined period of time has elapsed from the start of the execution of step S8, or a timing at which a start-up switch such as an ignition switch is switched from ON to OFF).

Note that the control shown in FIG. 3 is to switch the instruction voltage for the alternator 93 (output voltage of the alternator 93), and the instruction voltage for the alternator 93 is set to the reference voltage (first voltage) for a time period from the start of the execution of the control in FIG. 3 to a point in time before the execution of step S8. Furthermore, the instruction voltage for the alternator 93 is set to the second voltage that is greater than the reference voltage for a time period from the execution of the processing in step S8 to the predetermined termination timing. Note however that, in either the time period in which the instruction voltage for the alternator 93 is set to the reference voltage (first voltage) or the time period in which it is set to the second voltage, operations of the alternator 93 can be disabled if a predetermined disabling condition is met. Also, any of various well-known timings may be used as the timing at which the operation of the alternator 93 is disabled.

The following will describe examples of effects of the present configurations.

The alternator control device 1 can easily handle a rapid increase in the electric power consumption due to a load that tends to be used under a predetermined positional condition when the vehicle travels at a low speed, and even if, under an abnormal state of the battery 91, the load operates in the above-described situation (in which the speed of the vehicle is in the predetermined low speed range and the position of the vehicle meets the predetermined positional condition), a problem resulting from an insufficient output voltage of the alternator 93 is unlikely to occur.

In the alternator control device 1, the position determination unit 16 functions to determine that the positional condition is met at least in a case where the position of the vehicle is in a predetermined "parking vicinity area". If the vehicle is travelling at a low speed and is located in the parking vicinity area, it is likely that the vehicle will enter a parked state, and loads associated with parking (such as, for example, an electric power steering system, a steer-by-wire system, and an electric control type four-wheel steering system) will operate to assist the steering operation using a motor or reduce the radius of rotation, which involves the risk that the consumption current will rapidly increase. Accordingly, the position determination unit 16 functions to determine that the positional condition is met at least in a case where the position of the vehicle is in the predetermined parking vicinity area. With this measure, if the speed of the vehicle changes to a low speed in a parking vicinity area, it is possible to increase the output voltage of the alternator 93 to prepare for expected load currents, and thus it is easier to prevent the problem of an insufficient output voltage that results from an operation associated with parking when the battery 91 is in an abnormal state.

In the alternator control device 1, the position determination unit 16 functions to determine that the positional condition is met at least in a case where the position of the vehicle is in a predetermined intersection vicinity area. If the vehicle is travelling at a low speed and is located in the intersection vicinity area, it is likely that the vehicle will turn right or left for example, and loads associated with a right turn or a left turn (such as, for example, an electric power steering system, a steer-by-wire system, and an electric control type four-wheel steering system) will operate to assist the steering operation using the motor or reduce the radius of rotation, which involves the risk that the consumption current will rapidly increase. Accordingly, the position determination unit 16 functions to determine that the positional condition is met at least in a case where the position of the vehicle is in the predetermined intersection vicinity area. With this measure, if the speed of the vehicle changes to a low speed in an intersection vicinity area, it is possible to increase the output voltage of the alternator 93 to prepare for expected load currents, and thus it is easier to prevent the problem of an insufficient output voltage that results from an operation associated with a right or left turn when the battery 91 is in an abnormal state.

In the alternator control device 1, the battery state determination unit 12 functions to determine that the state of the vehicle is the predetermined normal state at least on the condition that the state of deterioration of the battery 91 does not exceed a predetermined level of deterioration (specifically, the SOH of the battery 91 is less than or equal to the second threshold). If the state of deterioration of the battery 91 exceeds the predetermined level of deterioration (if the state of deterioration of the battery 91 has advanced), the alternator control device 1 can easily increase the output voltage of the alternator 93 before rapid electric power consumption occurs, and make it less likely that a problem resulting from an insufficient output voltage of the alternator 93 will occur.

In the alternator control device 1, the battery state determination unit 12 functions to determine that the state of the vehicle is the predetermined normal state at least on the condition that the state of charge of the battery 91 exceeds a predetermined level of charge (specifically, the SOC of the battery 91 exceeds the first threshold). If the state of charge of the battery 91 does not exceed the predetermined level of charge (if the amount of charge of the battery 91 is relatively low), the alternator control device 1 can easily increase the output voltage of the alternator 93 before rapid electric power consumption occurs, and make it less likely that a problem resulting from an insufficient output voltage of the alternator 93 will occur.

Embodiment 2

The following will describe Embodiment 2.

Figure 4:
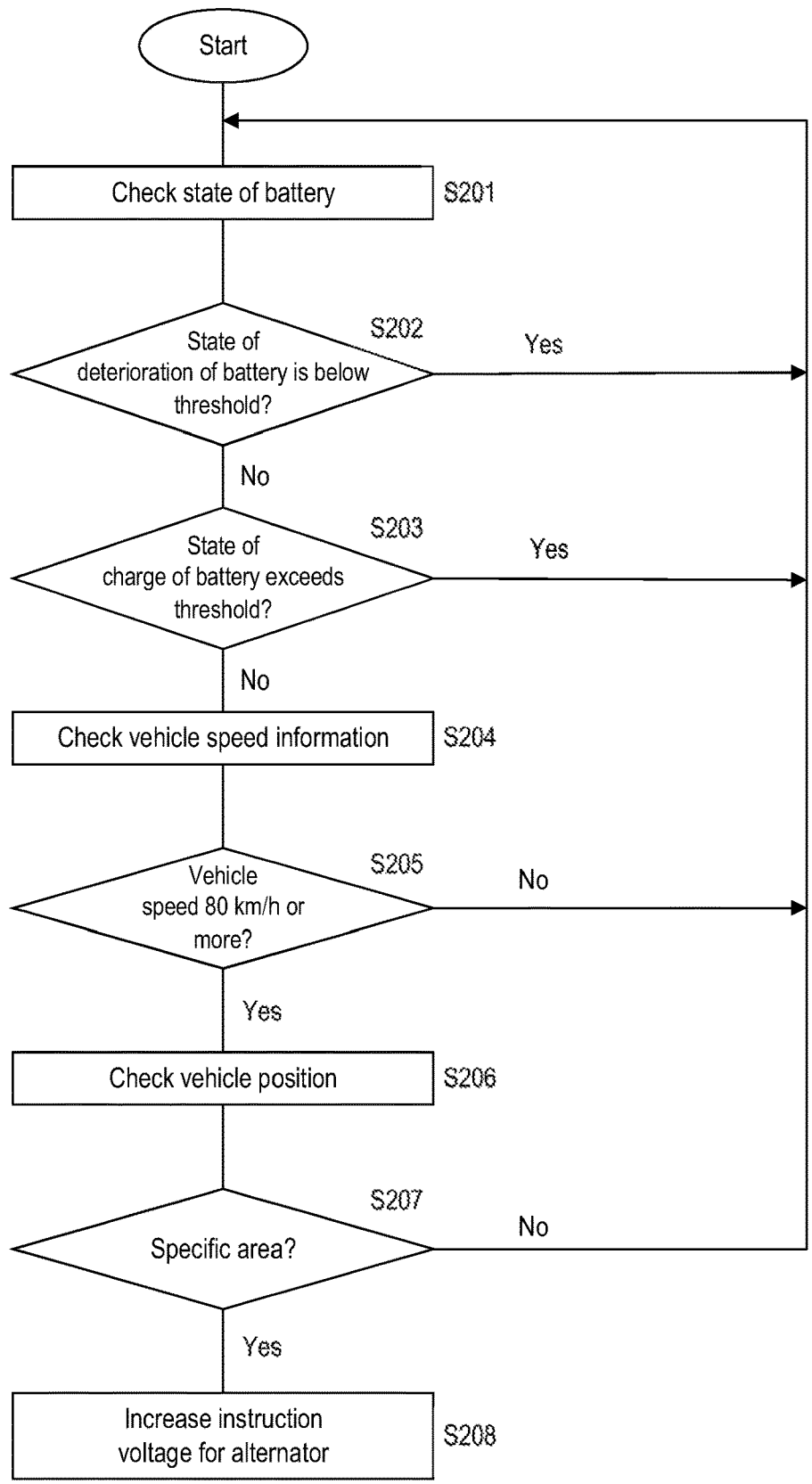
FIG. 4 is a flowchart illustrating an example of a flow of alternator control executed by an alternator control device according to Embodiment 2.

An alternator control device 1 according to Embodiment 2 is the same as the alternator control device 1 of Embodiment 1 except for control shown in FIG. 4 being executed in place of the control in FIG. 3, and specific content of the functions shown in FIG. 2. For example, hardware configurations are the same as those of the alternator control device 1 of Embodiment 1, and thus in the following description, FIGS. 1 and 2 are referenced for the hardware configurations. Note that, in the electrical configuration of the vehicle 190 that includes the alternator control device 1, the constituent components other than the alternator control device 1 have the same configurations and functions as those described in Embodiment 1.

Also the alternator control device 1 of Embodiment 2 can be expressed in functional blocks as shown in FIG. 2, and includes a control circuit 10, a not-shown storage unit, and the like. The control circuit 10 is configured as a microcomputer for example, and has a CPU, a memory such as a ROM or RAM, an AD converter, and the like.

In the alternator control device 1 of Embodiment 2, a battery state determination unit 12 (FIG. 2) functions similar to the battery state determination unit 12 in the alternator control device 1 of Embodiment 1.

A vehicle speed determination unit 14 (FIG. 2) of the alternator control device 1 of Embodiment 2 is a unit for determining whether or not the speed of the vehicle in which the on-board power supply system 100 is installed is within a predetermined high speed range. Also in the present configuration, vehicle speed information indicating the speed of the vehicle 190 is input from the ABSECU 180, and the vehicle speed determination unit 14 is configured to be able to determine whether or not the speed of the vehicle 190 is within the predetermined high speed range (for example, a range from 80 (km/h) or greater).

A position determination unit 16 of the alternator control device 1 of Embodiment 2 is a unit for determining whether or not the position of the vehicle 190 meets a predetermined positional condition. In the present configuration, a specific area is determined in advance on a map specified by using map information, and the position determination unit 16 determines that "the predetermined positional condition is met" if the position of the vehicle 190 specified based on position information obtained from the navigation ECU 170 is within this specific area. Specifically, on the map specified by using the map information, a given curve vicinity area (for example, an area within a predetermined distance from a specific curve position) on a predetermined arterial road (such as an expressway) is defined as a first specific area, and a given change-to-low-speed prospective area (for example, an area within a predetermined distance from a tollgate or a predetermined traffic jam expected region) on a predetermined arterial road (such as an expressway) is also defined as a second specific area. Also, the position determination unit 16 functions to determine that the positional condition is met if the position of the vehicle 190 specified by the position information obtained from the navigation ECU 170 is within the "first specific area" or the "second specific area".

The output voltage instruction unit 18 is a unit for controlling switching of the output voltage of the alternator 93 between a first voltage, which is a reference voltage, and a second voltage that is higher than the reference voltage. Specifically, the output voltage instruction unit 18 gives an instruction to increase the output voltage of the alternator 93 relative to the reference voltage, if it is determined by the battery state determination unit 12 that the state of the battery 91 is not the "predetermined normal state", if it is determined by the vehicle speed determination unit 14 that the speed of the vehicle 190 is in the "predetermined high speed range", and if it is determined by the position determination unit 16 that the position of the vehicle 190 meets the "positional condition".

The following will describe control of the alternator executed by the alternator control device 1 with reference to FIG. 4 and the like.

The alternator control device 1 of Embodiment 2 executes control shown in FIG. 4 if, for example, the vehicle 190 enters a start-up state (for example, if a start-up switch such as an ignition switch is switched from OFF to ON). After the start of the control of FIG. 4, the alternator control device 1 first checks, in step S201, the state of the battery 91. The processing in step S201 is the same as that in step S1 in FIG. 3, and, specifically, the alternator control device 1 checks for notifications received from the battery monitoring unit 92, and obtains, from the battery monitoring unit 92, values (SOC and SOH) that indicate the state of the battery 91.

After step S201, the alternator control device 1 determines, in step S202, whether or not the state of deterioration of the battery is below a threshold (specifically, whether or not the SOH obtained from the battery monitoring unit 92 is less than or equal to the second threshold). If it is determined in step S202 that the SOH obtained from the battery monitoring unit 92 is less than or equal to the second threshold (if the state of deterioration of the battery is below the threshold), the alternator control device 1 returns to the processing in step S201. On the other hand, if it is determined in S202 that the SOH obtained from the battery monitoring unit 92 is not less than the second threshold (if the state of deterioration of the battery exceeds the threshold), the alternator control device 1 moves to the processing in step S203.

If No in step S202, the alternator control device 1 determines in step S203 whether or not the state of charge of the battery 91 exceeds a threshold (specifically, whether or not the SOC obtained from the battery monitoring unit 92 exceeds the first threshold). If it is determined in step S203 that the SOC obtained from the battery monitoring unit 92 exceeds the first threshold (the state of charge of the battery 91 exceeds the threshold), the alternator control device 1 returns to the processing in step S201. On the other hand, if it is determined in step S203 that the SOC obtained from the battery monitoring unit 92 does not exceed the first threshold (the state of charge of the battery 91 does not exceed the threshold), the alternator control device 1 moves to the processing in step S204.

If No in step S203, the alternator control device 1 checks, in step S204, vehicle speed information received from the ABSECU 180, and then determines, in step S205, whether or not the speed (vehicle speed) of the vehicle 190 specified by the vehicle speed information is in the predetermined high speed range (specifically, a range from 80 km/h or more). If it is determined in step S205 that the vehicle speed is not greater than or equal to 80 km/h (it is determined that the vehicle speed is not in the predetermined high speed range), the alternator control device 1 returns to the processing in step S201. On the other hand, if it is determined in step S205 that the vehicle speed is greater than or equal to 80 km/h (it is determined that the vehicle speed is in the predetermined high speed range), the alternator control device 1 moves to the processing in step S206.

If Yes in step S205, the alternator control device 1 checks, in step S206, vehicle position information received from the navigation ECU 170, and confirms the current position of the vehicle 190 (at a point in time when step S206 is executed). Then, after step S206, the alternator control device 1 performs processing in step S207 to determine whether or not the position of the vehicle 190 confirmed in step S206 is in an above-described specific area (specifically, the predetermined "first specific area" or "second specific area"). If it is determined in step S207 that the position of the vehicle 190 confirmed in step S206 is in neither the predetermined "first specific area" nor "second specific area", the alternator control device 1 returns to the processing in step S201. On the other hand, if it is determined in step S207 that the position of the vehicle 190 confirmed in step S206 is in the predetermined "first specific area" or "second specific area", the alternator control device 1 sets the instruction voltage for the alternator 93 to a second voltage that is higher than the reference voltage (first voltage).

If, in step S208, the instruction voltage for the alternator 93 is set to the second voltage in this way, the setting just needs to be kept until a predetermined termination timing (for example, a timing at which a predetermined period of time has elapsed from the start of the execution of step S208, or a timing at which a start-up switch such as an ignition switch is switched from ON to OFF).

Note that the control shown in FIG. 4 is to switch the instruction voltage for the alternator 93 (output voltage of the alternator 93), and the instruction voltage for the alternator 93 is set to the reference voltage (first voltage) for a time period from the start of the execution of the control in FIG. 4 to a point in time before the execution of step S208. Furthermore, the instruction voltage for the alternator 93 is set to the second voltage that is greater than the reference voltage for a time period from the execution of the processing in step S208 to the predetermined termination timing. Note however that, in either the time period in which the instruction voltage for the alternator 93 is set to the reference voltage (first voltage) or the time period in which it is set to the second voltage, operations of the alternator 93 can be disabled if a predetermined disabling condition is met. Also, any of various well-known timings may be used as the timing at which the operation of the alternator 93 is disabled.

The alternator control device 1 according to the present configuration can easily handle a rapid increase in the electric power consumption due to a load that tends to be used under a predetermined positional condition when the vehicle travels at a high speed, and even if, under an abnormal state of the battery 91, the load operates in the above-described situation (in which the speed of the vehicle 190 is in the predetermined high speed range and the position of the vehicle 190 meets the predetermined positional condition), a problem resulting from an insufficient output voltage of the alternator 93 is unlikely to occur.

The position determination unit 16 functions to determine that the positional condition is met at least in a case where the position of the vehicle 190 is in a given curve vicinity area on a predetermined arterial road. If the vehicle 190 is located in the curve vicinity area while traveling on the arterial road at a high speed, it is likely that the vehicle 190 will enter a curve at a relatively high speed, and in this case, and loads associated with curve-turning operations (such as, for example, an electric-powered stabilizer, an electric-powered suspension, an electric-powered damper, and an electric-powered four-wheel steering system) will operate to enhance the running stability, which involves the risk that the consumption current will rapidly increase. Accordingly, the position determination unit 16 functions to determine that the positional condition is met at least in a case where the position of the vehicle 190 is in a given curve vicinity area on a predetermined arterial road. With this measure, if the vehicle enters a curve vicinity area in a predetermined state while traveling on an arterial road, it is possible to increase the output voltage of the alternator 93 to prepare for expected load currents, and thus it is easier to prevent the problem of an insufficient output voltage that results from a curve-turning operation being executed when the battery 91 is in an abnormal state.

In the alternator control device 1, the position determination unit 16 functions to determine that the positional condition is met at least in a case where the position of the vehicle 190 is in a given change-to-low-speed prospective area on a predetermined arterial road. If the vehicle 190 is located in the change-to-low-speed prospective area (such as an area near a tollgate or in the vicinity of a predetermined area in which traffic jams are frequently recorded) while traveling on the arterial road at a high speed, it is likely that the speed of the vehicle 190 will change to a low speed, and a load associated with the change to the low speed (such as, for example, an electric-powered control brake) will operate to assist a brake pedal force, which involves the risk that the consumption current will rapidly increase. Accordingly, the position determination unit 16 functions to determine that the positional condition is met at least in a case where the position of the vehicle 190 is in a given change-to-low-speed prospective area on a predetermined arterial road. With this measure, if the vehicle enters a change-to-low-speed prospective area in a predetermined state while traveling on the arterial road, it is possible to increase the output voltage of the alternator 93 to prepare for an expected load current, and thus it is easier to prevent the problem of an insufficient output voltage that results from an operation for changing the speed from a high speed state to a low speed state when the battery 91 is in an abnormal state.

Other Embodiments

The present disclosure is not limited to the description above and the embodiments described with reference to the drawings, and the technical scope of the present disclosure encompasses, for example, the following embodiments. Furthermore, the above-described embodiments or the embodiments below may be combined with each other as long as they do not contradict each other.

In Embodiments 1 and 2, the battery monitoring unit 92 calculates a SOC and a SOH, but a configuration is also possible in which the alternator control device 1 detects a charge voltage and an output current of the battery 91, and the alternator control device 1 calculates a SOC and a SOH.

In the control in FIG. 3 of Embodiment 1, one of the determination processes in steps S2 and S3 may also be omitted. In the control in FIG. 4 of Embodiment 2, one of the determination processes in steps S202 and S203 may also be omitted.

The invention claimed is:

1. An alternator control device included in an on-board power supply system provided with an on-board battery, and an on-board alternator that performs a power generation operation to supply electric power to the battery, the alternator control device being configured to control the alternator and comprising:
  a battery state determination unit configured to determine whether or not a state of the battery is a predetermined normal state;
  a vehicle speed determination unit configured to determine whether or not a speed of a vehicle in which the on-board power supply system is installed is within a predetermined low speed range;

a position determination unit configured to determine whether or not a position of the vehicle meets a predetermined positional condition; and an output voltage instruction unit configured to give an instruction to increase an output voltage of the alternator to a voltage that is greater than a reference voltage, if it is determined by the battery state determination unit that the state of the battery is not the predetermined normal state, if it is determined by the vehicle speed determination unit that the speed of the vehicle is within the predetermined low speed range, and if it is determined by the position determination unit that the position of the vehicle meets the positional condition, wherein the vehicle speed determination unit determines whether or not the speed of the vehicle is within the low speed range based on an output from a sensor installed in the vehicle, and the position determination unit determines that the positional condition is met in at least one of cases where the position of the vehicle is in a predetermined parking vicinity area and where the position of the vehicle is in a predetermined intersection vicinity area.

2. An alternator control device included in an on-board power supply system provided with an on-board battery, and an on-board alternator that performs a power generation operation to supply electric power to the battery, the alternator control device being configured to control the alternator and comprising:

a battery state determination unit configured to determine whether or not a state of the battery is a predetermined normal state;

a vehicle speed determination unit configured to determine whether or not a speed of a vehicle in which the on-board power supply system is installed is within a predetermined high speed range;

a position determination unit configured to determine whether or not a position of the vehicle meets a predetermined positional condition; and an output voltage instruction unit configured to give an instruction to increase an output voltage of the alternator to a voltage that is greater than a reference voltage, if it is determined by the battery state determination unit that the state of the battery is not the predetermined normal state, if it is determined by the vehicle speed determination unit that the speed of the vehicle is within the predetermined high speed range, and if it is determined by the position determination unit that the position of the vehicle meets the positional condition, wherein the vehicle speed determination unit determines whether or not the speed of the vehicle is within the high speed range based on an output from a sensor installed in the vehicle, and the position determination unit determines that the positional condition is met in at least one of cases where the position of the vehicle is in a predetermined curve vicinity area on a predetermined arterial road and where the position of the vehicle is in a predetermined change-to-low-speed prospective area on a predetermined arterial road.

3. The alternator control device according to claim 1, wherein the battery state determination unit determines that the state of the battery is the predetermined normal state at least on the condition that a state of deterioration of the battery does not exceed a predetermined level of deterioration.

4. The alternator control device according to claim 1, wherein the battery state determination unit determines that the state of the battery is the predetermined normal state at least on the condition that a state of charge of the battery exceeds a predetermined level of charge.

5. The alternator control device according to claim 2, wherein the battery state determination unit determines that the state of the battery is the predetermined normal state at least on the condition that a state of deterioration of the battery does not exceed a predetermined level of deterioration.

6. The alternator control device according to claim 2, wherein the battery state determination unit determines that the state of the battery is the predetermined normal state at least on the condition that a state of charge of the battery exceeds a predetermined level of charge.

7. The alternator control device according to claim 3, wherein the battery state determination unit determines that the state of the battery is the predetermined normal state at least on the condition that a state of charge of the battery exceeds a predetermined level of charge.

* * * * *